(12) United States Patent
Yeung et al.

(10) Patent No.: US 8,081,070 B2
(45) Date of Patent: Dec. 20, 2011

(54) MOBILE SECURITY MONITORING METHOD AND SYSTEM AND AN ALARM SECURITY NODE IN THE SYSTEM

(75) Inventors: Peter Yeung, Kista (SE); Ping Li, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 910 days.

(21) Appl. No.: 11/988,835

(22) PCT Filed: Jun. 16, 2006

(86) PCT No.: PCT/SE2006/050203
§ 371 (c)(1),
(2), (4) Date: Jan. 15, 2008

(87) PCT Pub. No.: WO2007/032731
PCT Pub. Date: Mar. 22, 2007

(65) Prior Publication Data
US 2009/0231122 A1    Sep. 17, 2009

(30) Foreign Application Priority Data
Sep. 12, 2005    (SE) ........................... 0502017

(51) Int. Cl.
*G08B 25/00*    (2006.01)
(52) U.S. Cl. ..... 340/524; 340/506; 340/507; 340/539.1; 340/539.11; 340/539.13; 340/3.1
(58) Field of Classification Search .................. 340/506, 340/507, 524, 539.1, 539.11, 539.13, 3.1, 340/825.36, 825.49
See application file for complete search history.

(56) References Cited

U.S. PATENT DOCUMENTS
5,959,529 A * 9/1999 Kail, IV .................. 340/539.12
(Continued)

FOREIGN PATENT DOCUMENTS
EP        1 536 382 A2    6/2005
(Continued)

OTHER PUBLICATIONS
International Search Report for PCT/SE2006/050203 mailed Oct. 11, 2006.
(Continued)

*Primary Examiner* — Daryl Pope
(74) *Attorney, Agent, or Firm* — Nixon & Vanderhye P.C.

(57) ABSTRACT

A mobile security monitoring method and system are provided. An alarm security node communicates with an intelligent security that is activated by a breach in a security zone. This breach starts a video monitoring/recording sequence that is sent out via broadband link to an alarm center. The alarm center forwards this alarm information to a user as SMS/MMS information through a mobile network. The user can view and evaluate what is going on at the security zone and can decide what action to initiate. This minimizes false alarm generation and thus cuts down the costs of following upon false alarm(s) by an alarm security provider. For security and cost reasons, the intelligent security system may be the only client of the server-side alarm center. Existing IT infrastructure at the security zone can be used such as W-LAN, broadband, GPRS, and mobile devices. A mobile phone can be used for activation and deactivation of intelligent security system based on a manual push of a button on the user device. The activation/deactivation may depend on mobile's location as determined by GPS or other mobile positioning system based on mobile network infrastructures that use a spatial-based alarm trigger.

11 Claims, 4 Drawing Sheets

U.S. PATENT DOCUMENTS

| | | | |
|---|---|---|---|
| 6,031,455 A * | 2/2000 | Grube et al. | 340/539.26 |
| 6,661,340 B1 | 12/2003 | Saylor et al. | |
| 2004/0186739 A1 | 9/2004 | Bolles et al. | |

FOREIGN PATENT DOCUMENTS

| | | |
|---|---|---|
| JP | 2000-83108 | 3/2000 |
| WO | WO 2005/072075 A2 | 8/2005 |

OTHER PUBLICATIONS

Written Opinion of the International Searching Authority for PCT/SE2006/050203.

Written Opinion of the International Preliminary Examining Authority for PCT/SE2006/050203.

U.S. Appl. No. 10/698,974, filed Oct. 31, 2001; Inventor: David Bolles et al.

* cited by examiner

MOBILE SECURITY MONITORING METHOD AND SYSTEM AND AN ALARM SECURITY NODE IN THE SYSTEM

This application is the U.S. national phase of International Application No. PCT/SE2006/05023, filed 16 Jun. 2006, which designated the U.S. and claims priority to Sweden Application No. 0502017-7, filed 12 Sep. 2005, the entire contents of each of which are hereby incorporated by reference.

TECHNICAL FIELD

The technology described in this application relates in general to the area of security in the field of mobile communication and, in particular, to a mobile security monitoring method and system supporting intelligent security alarming with mobile positioning. The technology described in this application further relates to an alarm security node included in such a system.

BACKGROUND

Today's existing alarm systems are inflexible and provide limited interaction between the user and an alarm security provider to handle an alarm situation. For example, a typical alarm system is shown in U.S. Ser. No. 10/698,974 A wherein an alarm system includes a control device regulating and receiving feedback from various conventional fixed sensors. The control device further reports events via a dispatch mechanism to a user. The user via a web interface regulates alarm parameters in a dispatch configuration system in the alarm system.

The control device interfaces with the dispatch configuration system and other components of alarm system via telephone network lines. Further, the user via a control device panel actively configures the dispatch mechanism in order to setup a custom alarm dispatch requirement and instructions.

Thus, existing alarm systems use a fixed architecture of alarm devices, directly controlled by the user to configurate and regulate the alarm devices with telephone network communication. Said existing systems work well when set up but are not easy to adapt to a new monitoring set up. Further it puts high demands on the end-user to comprehend and configure the alarm system in non-real time optimization and with no possibility to induce feedback parameters to improve the protection of security zone in the real time operation.

SUMMARY

Therefore, there is a need for versatile, a modern mobile telecommunication based, low latency decision time, a complete alarm security system. Specifically there is a need for a security monitoring system based on today's modern mobile telecommunications with ability to use future technological developments i.e. mobile networks using mobile internet. In particular there is a need to use a mobile positioning technology and/or a GPS functionality to validate the user physical location with respect to the security zone. It is further desirable to introduce a third entity i.e. an alarm security provider providing complete security monitoring solution. It is also further desirable to have a flexible solution in the form of an intelligent security system communicating with an alarm center in a variety of modern modes i.e. broadband, GPRS, WLAN technologies among others.

On the implementation scale, it is desirable to have a changeable solution for the placement of plurality detecting devices in the security monitoring systems, which are wirelessly connected within the intelligent security system. It is further desired that the user, the intelligent security system and the alarm center in a control feedback manner, improving the latency period, flexibility, and minimizing overall cost level of maintaining such a system.

The technology described in this application handles the disadvantages of the prior art in detail below, but in general, the technology described in this application provides an improved all encompassing security monitoring method and system utilizing mobile telecommunication technology. A mobile security monitoring system is developed where the means and method are constructed to monitor a security zone along with user's physical location by utilizing a combination of the intelligent security system and the alarm center control using a mobile telecommunication and a mobile network based communication assisted by a mobile positioning system.

In accordance with one non-limiting, example embodiment, the intelligent security system comprises a logic control device, plurality of detecting devices, and a recording video device for whose output information and control are regulated by an alarm center. The placement of the diverse devices is arranged in a wireless network in the security zone, making their distribution fixture free. This affords the ease in placement possibilities of such devices with changing security alarm setup needs in current/different security zone.

In another non-limiting, example embodiment, the alarm center tracks a user device's physical location with respect to the security zone using the mobile positioning system and/or the GPS functionality. In yet another embodiment, at least one of said detecting devices are activated by change in a physical location of the user device as the user exits/enters the security zone. One of the benefits here for the user will be that the intelligent security system can be set on active or passive state as user enters or leaves the security zone without manual activation of the mobile security monitoring system.

In another non-limiting, example embodiment, in case of activation of an alarm condition, both the intelligent security system and the alarm center are involved in monitoring and verifying alarm information with feedback from the user. The alarm information in the form of a text and/or video alarm information are sent to the user device for feedback on the authenticity of the alarm condition. The total cost of maintaining the mobile security alarm system goes down when both the alarm center and the user provide feedback to the alarm condition generated by the intelligent security system.

This communication is done in real time using mobile telecommunication system along with broadband, GPRS, WLAN and other mobile positioning and mobile communication schemes. The inclusion of the alarm center in this security scheme is crucial to provide a complete and efficient security solution to the user. The use of mobile positioning system and mobile communication among others provides real time assessment and feedback to confirm and take reactive measures to the alarm condition.

BRIEF DESCRIPTION OF THE DRAWINGS

A more thorough understanding may be derived from the detailed specification along with the figures. The reference numbers in the figures are consistent with the reference numbers in the specification and the rest of the patent application.

DETAILED SPECIFICATION

Figure 1:
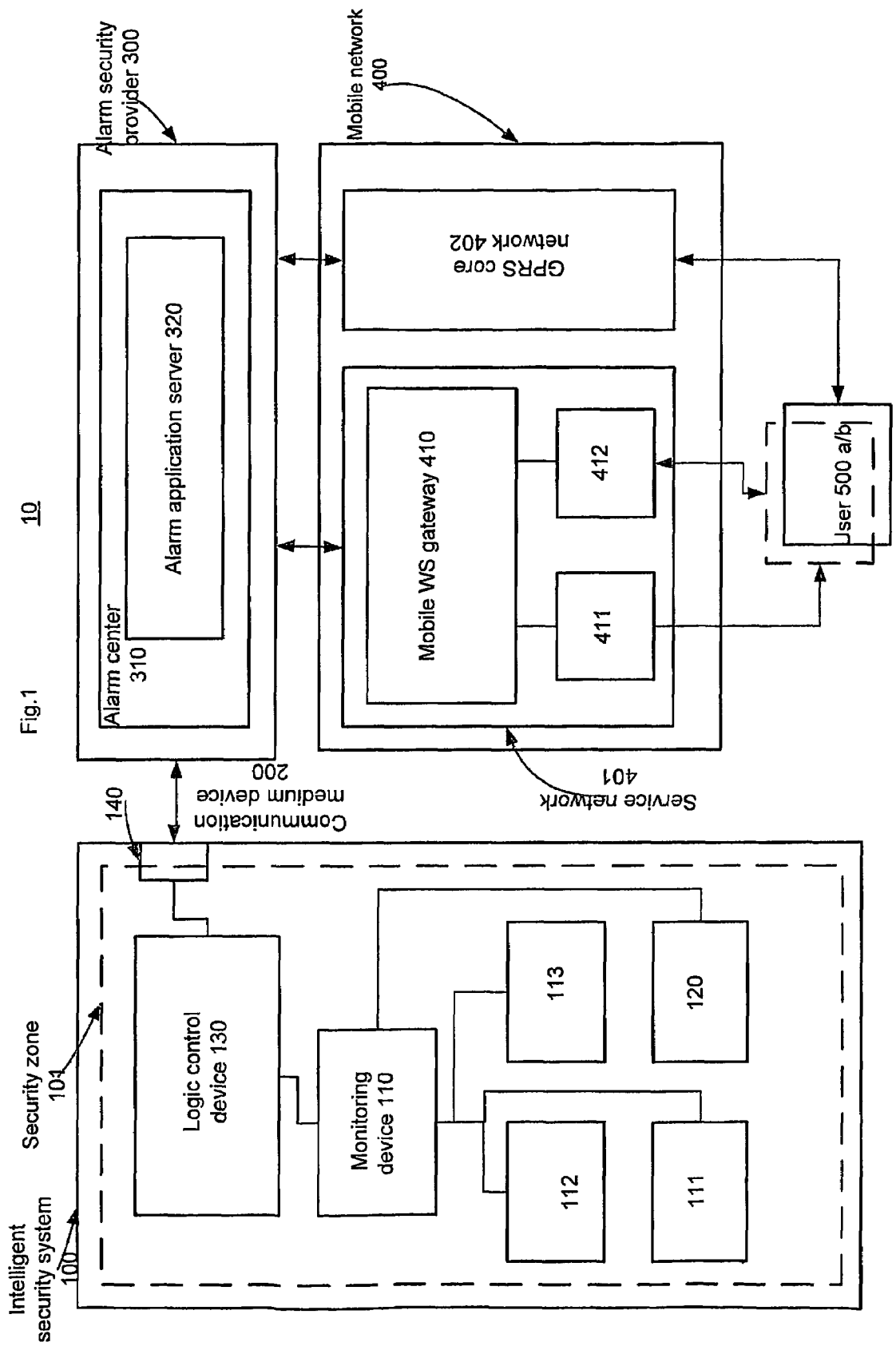
FIG. 1 is a block diagram of a mobile security monitoring system.

The specification detailed hence forth has the objective to provide a straight forward scheme in implementation of different non-limiting, example embodiments. More specifically, a mobile security monitoring method, system and alarm security node aspects are not only suited for a residential alarm system use but also for commercial alarm systems.

Hence, in accordance with the various aspects and with reference to the exemplary embodiments, the technology described in this application provides an improved mobile security monitoring arrangement. For example, the technology described in this application provides a mobile security monitoring system 10, in which an alarm security provider 300 with feedback from a user device 500 and an intelligent security system 100, controls and monitors a security zone 101 utilizing a mobile network 400. The user and the user device are defined through out this application as synonymous to each other i.e. 500 for the sake of clarity. Where ever differences arise in the discussion, the user and user device will be discussed with clarity. Further the user device 500 is a mobile handheld device to be used with the present mobile telecommunication networks.

The mobile security monitoring system 10 in FIG. 1 comprises the intelligent security system 100 which is monitoring the security zone 101 of said user 500. The intelligent security system 100 further comprises a monitoring device 110 for monitoring a plurality of detecting devices 111-113 in said security zone 101. The monitoring device 110 functions as a hardware interface device for the detecting devices 111-113.

The monitoring device 110 is used to detect whether the circuit is in open or close state for the detecting devices 111-113. In the typical state the circuit is closed for non-activity. In the monitoring device 110, the circuit state is normally set to the normal close state to signify a deactivate state. One circuit loop corresponds to one detecting device function. The monitoring device 110 may also have an output relay i.e. for turn on and off an alarm siren 111. In general the monitoring device module 110 using the detecting devices 111-113 detects and alerts an alarm situation and assists in generating an alarm condition to be sent to an alarm center 310. Said alarm condition contains detecting and alerting parameters of the detecting devices 111-113. Such a detecting device can be an infrared detector 112 for motion detection. Further said detecting devices for alerting can comprise said alarm siren 111 and/or a light based alert device (not shown in FIG. 1). Further an emergency button 113 can be provided for the user 500 to alert the alarm center 310. Any device fulfilling the functionality detecting a defined security zone 101 above can be used to implement the monitoring device 110.

It is further envisaged that such detecting devices can be influenced of temperature change, fire detection, and such detecting devices yet unknown. In another aspect, the detecting devices are wireless radio frequency based sensors, making their placement simple and cost effective.

In another embodiment, the detecting devices can be grouped in active and passive sensors activated by change in said physical location of said user device 500 in respect to said security zone 101 protected by said intelligent security system 100, ascertained by said user device's mobile positioning functionality. This will be further described in detail below.

Further a video device 120 is included in the intelligent security system 100 for the purpose of recording the alarm condition. The video device 120 can be a web-based camera, a video camera or similar. Further a logic control device 130 is included for reporting said alarm condition and alarm information to an alarm center 310 at the alarm security provider 300.

The logic control device 130 is based on a Java Standard Edition (J2SE) protocol, mainly for desktop applications. The logic control device 130 can use a Java Communication Application Programming Interface (JavaComm API) protocol to communicate with said monitoring device 110 for controlling hardware input/output behaviour. Further also a Java Media Framework Application Programming Interface (JMF API) is used for video sequence capture via the video device 120 and an audio sequence recording via a soundcard (not shown in the FIG. 1). The logic control device 130 further uses an Embedded Personal computer (PC) for conveying said alarm conditions and the alarm information using a Web Service (WS) over broadband and alternative route via GPRS. For the Java background services, WS are used.

The intelligent security system 100 utilizes the WS in a Simple Object Access Protocol (SOAP) protocols with a WS security based on a Public Key Infrastructure (PKI) digital signature such as Extended Markup Language (XML) element such as XML Digital Signatures (XMLDSig) and encryption information. A Secure Socket Layer (SSL) is used as an alternative to the WS based security. For the SSL client, certificates are used for the identification purposes. The intelligent security system 100 uses a digital certificate with the PKI standard so that the alarm security provider 300 can verify the user certificates.

Further the intelligent security system 100 has no server role due to security and cost reason. All information that the alarm center 310 wants to provide to the intelligent security system 100 is given on the return message from a heartbeat message sent by the intelligent security system 100.

All communication from the logic control device 130 of the intelligent security system 100 towards the alarm center 310 in the alarm security provider 300 uses the SOAP protocol over an internet HTTP protocol. An output means 140 is provided for sending said alarm condition and said alarm information to the alarm center 310. A communication medium device 200 comprising a broadband, a ground based telephony, GPRS, a WLAN, a high-speed wireless system or a combination thereof is provided for transmitting said alarm condition and said alarm information.

The alarm center 310 is integral part of the alarm security provider 300. Further, the alarm center 310 comprises an alarm application server 320. The alarm center 310 is arranged to receive alarm condition and alarm information via the communication medium device 200 from said intelligent security system 100.

The alarm application server 320 is based on the Java Enterprise Edition (J2EE) mainly for server side applications, in a cluster formation. In particular, the J2EE can be based on the protocol J2EE 1.4 with Java XML Remote Procedure Call (JAX-RPC) or a JAX-WS API for handling WS configuration. The alarm center 310 acting as a value added service provider (VASP) and is using a web technology for getting information on all ongoing alarm conditions and alarm information. The alarm center 310 can be divided in different district area covering various security zones. When the alarm center 310 operator logs in to the alarm application server 320, they can select a distinct district area with a pool of security guard (s) in said district area for flexible security operations. When the alarm condition occurs, the alarm center 310 operator can use a Java applet to push alarm notification based on the alarm condition and alarm information and refreshes the web content using the web technology. The java applet utilizes a polling thread in the background towards the alarm application server 320. This results in the physical location of the alarm center 310 operator is flexible, and operators can be placed in diverse locations. In a further embodiment, the alarm center 310 operator communicates with a security guard in field i.e. using an IP multimedia sub-system (IMS) push-to-talk telecommunication technology.

The alarm center 310 further has also an automatic pilot function in case the alarm center 310 operator is not available. The automatic pilot function can forward i.e. the alarm condition and/or alarm information to a closest security guard in the district are with input from a mobile positioning system 411 and/or user device 500 GPS functionality using a mobile network 400. The security guard will receive a multi-media system (MMS) message comprising the alarm condition and information. The alarm center operator Graphic User Interface (GUI) application management is mainly based on Java applet for graphical representative of the alarm situations and the security guards in the different physical locations on the map.

The mobile network 400 comprises a service network 401 and a GPRS Core network 402. The service network 401 further comprises a mobile WS gateway i.e. a ParlayX WS gateway 410, the mobile positioning system 411 and a messaging center 412. The messaging center 412 further comprises a short messaging system (SMS) i.e. a text information system and multi-media system (MMS) i.e. a video messaging system (not shown in FIG. 1). The alarm center 310 couples to the user device 500 via this mobile network 400. For purposes related to implementation, a mobile network 400 is not limited only to the systems described above.

The user device 500 is based on Java Micro Edition (J2ME) for mobile terminals, with IP connections over GPRS mobile telephony. The J2ME utilizes a SSL encryption and a Public Key Infrastructure (PKI) identification schemes for communication with the alarm center 310 coupled via the mobile network 400. The user device 500 is capable of receiving said SMS and MMS messages from the alarm application server 320 coupled via the mobile network 400.

Figure 2:
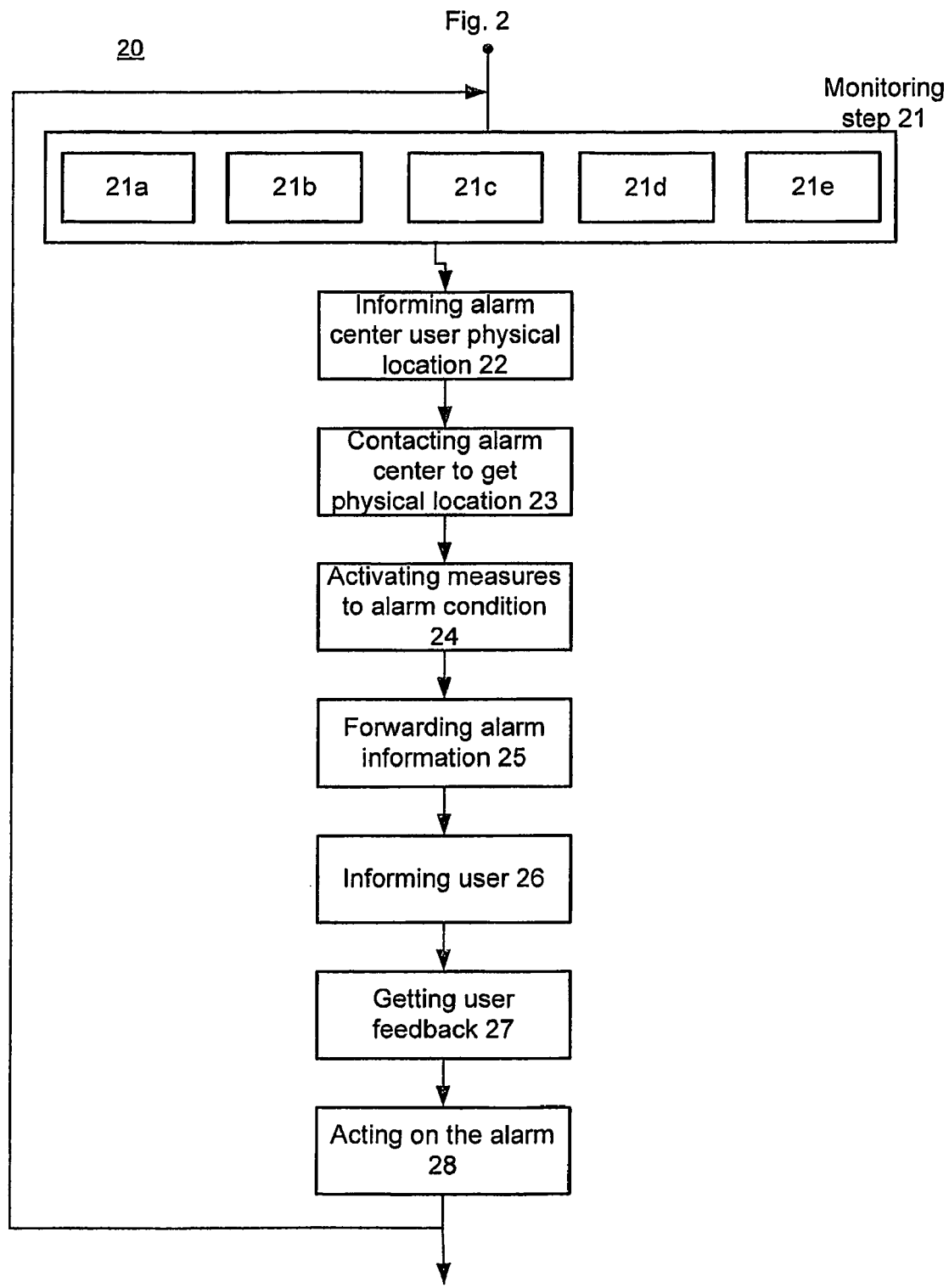
FIG. 2 is a process flow diagram of a mobile security monitoring method.

In FIG. 2, a process flow diagram of a mobile security monitoring method 20 is shown highlighting different method steps. A monitoring step 21 comprises the functionality of said logic device 130, plurality of said monitoring and detecting devices 110-113; and said video device 120. Further, the monitoring step 21 comprises the detecting step 21a for detecting the alarm condition in said intelligent security system 100. The detecting means comprises variety of detecting devices 110-113 in FIG. 1 i.e. movement sensors, temperature sensors, fire safety sensors, window and door safety sensors etc, which monitor and detect any breach or compromise of the security zone 101 protected by the intelligent security system 100.

The detecting step 21a is grouped in passive and active detecting i.e. depending on physical location of the user device 500 with respect to the security zone 101 protected by the intelligent security system 100. This entails that certain detecting sensor types such as fire alarm, water leakage sensor etc, are always in active state whether the user 500 is in the security zone 101 or not. The other sensors e.g. a burglar alarm is activated once the user 500 is outside the security zone 101 of the intelligent security system 100. The functionality of the detecting step 21a can be tailored to suit the user 500 needs and thus a variety of functionality can be derived.

Further, a conveying step 21b conveys the alarm condition from intelligent security system 100 to said alarm center 310 via said communication medium device 200 through output means port 140.

Further, the step 21c of feedback means from the alarm center 310 via said communication medium device 200 is incorporated in the monitoring step 21. This provides an interactive communication between the intelligent security system 100 and the alarm center 310. In step 21d, recording using recording means of said alarm information is provided i.e. video device 120. Further in step 21e, reacting functionality exists in intelligent security system 100 to fulfil requests by the said alarm center 310 via said communication medium device 200. The alarm center 310 can thus initiate and instruct the intelligent security system 100 to implement certain defensive and/or reactive measures to resolve and take action against the alarm condition.

In an alternate solution, the alarm center 310 is aware of the physical location of the user device 500 with respect to the security zone 101. In step 22, informing of the physical location of the user device 500 via the mobile positioning system 411 and/or the GPS functionality to the alarm center 310 is performed. Further, the mobile positioning system 411 can be an assisted global positioning system (A-GPS). Whilst during the use of GPS functionality, the user device 500 communicates with alarm center 310 via the GPRS Core network 402.

In step 23, the intelligent security system 100 is contacting said alarm center 310 via a communication medium device 200 for the purpose of acquiring present status of said user device 500 with respect to the security zone 101. This can be done via mobile positioning system 411 and or the GPS functionality. These steps (22 and 23) of confirming the physical location of the user 500 with respect to the security zone 101 assist the alarm center to instruct and provide information to the intelligent security system 100 to initiate appropriate security measures.

Once an alarm situation has been generated i.e. said alarm condition, it is forwarded to the alarm center 310. Further the physical location of the user 500 has been localized by the alarm center 310. The alarm center 310 after analyzing the above gathered information starts counter measures to react to the alarm situation. In step 24, activating measures in said intelligent security system 100 to respond to an alarm condition are provided. In an alternate aspect, this can result in that the video device 120 can start recording in the security zone 101 protected by the intelligent security system 100. Measures are provided within the working of the intelligent security system 100, where the alarm center 310 can trigger and initiate this activation step 24 as well as the intelligent security system 100 can initiate activation protocol without feedback from the alarm center 310 if required.

The recorded information of the alarm condition can together comprise the alarm information which is forwarded by the intelligent security system 100 to the alarm center 310 through the output means port 140 via the communication medium device 200 in step 25.

The alarm center 310 in step 26, informs said user device 500 of said alarm information via said mobile network 400. This is done to allow the user 500 to access the alarm information for the severity of the alarm situation. Further the alarm center 310 prompts (step 27) said user 500 to provide feedback on the alarm information to said alarm center 310 via the mobile network 400. In step 28, the alarm center 310 operates and takes action on said alarm information in conjunction with the feedback provided by the user 500.

Here an exemplary embodiment is presented with user A 500a and user B 500b who are presently situated within the security zone 101 protected by the intelligent security system 100. Both the users 500*a/b* being within the security zone 101, results in that the intelligent security system 100 is in a deactivated state with only passive detecting devices working in the background.

The user A 500*a* leaves the security zone 101 with the user device which has the J2ME application with the GPS. Also another implementation is to use A-GPS with a spatial trigger. The user device A 500*a* notifies the alarm center 310 via e.g. the GPRS connection via the mobile network 400 whilst exiting the security zone 101. The user device's said J2ME client application is continuously controlling the GPS position with respect to the security zone 101 in the background to see if user A 500*a* is leaving the security zone 101 or not. The alarm center 310 will not activate i.e. the burglar alarm functionality within the intelligent security system 100 as the user B's device 500*b* is still registered inside the security zone 101. Alternatively, user A 500*a* can manually activate the burglar alarm via the J2ME client application on user device using a J2ME midlet GUI as an option.

In an alternate embodiment, it is possible to initiate the intelligent security system 100 into active state even if e.g. user B 500*b* uses a non-GPS enabled user device. The user B 500*b* can do this using the user device's J2ME client that uses GPRS. In another aspect, an automatic activation of intelligent security system 100 is possible using the mobile positioning system 411 with the spatial trigger function. Thus, the mobile positioning system 411 notifies the alarm application server 320 that e.g. user B 500*b* is outside the security zone 101. Since none of the users 500*a/b* is inside the security zone 101; the alarm center 310 can initiate active state in the intelligent security system 100. If someone is still inside the security zone 101 during burglar alarm activation i.e. detected via the passive IR device 112, the intelligent security system 100 will send reject message towards the alarm center 310. A SMS will be sent to the last user device 500 that leaves the security zone 101 with the message i.e.: the burglar alarm can not be activated.

The intelligent security system 100 sends a heartbeat over the SOAP protocol on every other minute i.e. a heartbeat-time parameter over JAX-RPC WS towards the alarm center 310. The alarm center 310 returns a message indicating if the burglar alarm is set to active state or not. In a situation the communication medium device 200 is temporarily down, there are provisions to manually activate and deactivate the intelligent security system 100 by the user as well as the alarm security provider 300 personnel.

A security breach by e.g. a non-user in the security zone 101 results in that the IR detector 112 detects e.g. a human entity within the security zone 101 and it opens the normally closed alarm circuit loop to notify to the monitoring device module 110. The logic control device 130 is pulling the input status and notice that IR detector 112 circuit loop is open. The logic control device sets the alarm status to active state. Further logic control device 130 can start the video device 120 to record the incident and/or push the alarm condition to alarm center 310. The alarm information is sent as the SOAP message to the alarm center 310 via the communication medium device 200. Further said IR detector 112 notifies the exit of the non-user from the physical security zone 101 to the monitoring device module 110, where this alarm information is passed on to the alarm center 310. The alarm application server 320 converts this alarm information i.e. video clip into smaller clips for MMS usage. It further sends alarm information in MMS form via a ParlayX SOAP protocol through a mobile network 400 to the user device 500.

The user 500 at this point opens the J2ME application on the user device, whereas following option maybe presented as a feedback option back to the alarm center 310: a) option to send an alarm security provider 300 security guard to the security zone 101; b) further when the user 500 presses the J2ME GUI bottom on the user device feedback message is generated that is send over e.g. the GPRS towards the alarm center 310 to confirm that the user 500 has been informed; c) another alternative is that the user 500 can also press on another J2ME GUI button on the user device to choose to not send any alarm security provider 300 security guard if user 500 considers it to be a false alarm situation.

Further when the user on returning to the security zone 101, the alarm center 310 will get notification either from the J2ME application with the GPS receiver or via the spatial trigger from the mobile positioning system 411. When the intelligent security system 100 initiates the heartbeat i.e. every second minute over the SOAP protocol towards the alarm center 310 via the communication medium device 200; then the alarm center 310 returns deactivation message to the intelligent security system 100.

Whilst the user 500 is present inside the security zone 101 of the intelligent security system 100, certain detecting devices are by passed e.g. the IR detector 112 within the security zone 101. Only the passive IR detector 112 is by passed so the user 500 can move around the security zone 101 without setting of the alarm condition. Such functions can be pre-programmed or manually controlled i.e. via the J2ME application on the user device 500 i.e. by sending message to the alarm center 310. The alarm center 310 will forward this order to intelligent security center 100 during the heartbeat message via the communication medium device 200.

Figure 3:
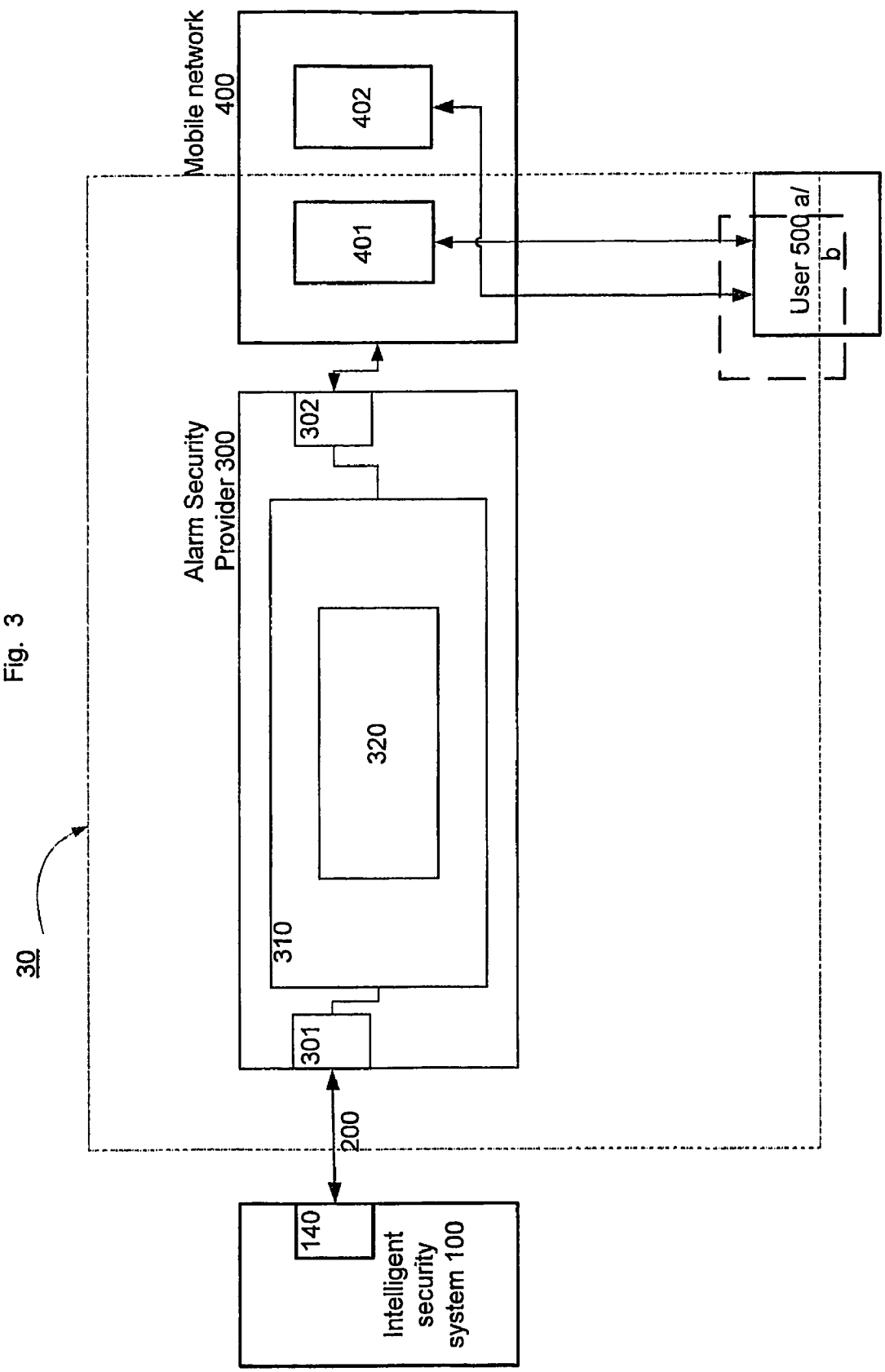
FIG. 3 is a block diagram of an alarm security node in mobile security system.

An alarm security node 30 in FIG. 3 in comprises the alarm security provider 300, a VASP and its functionality with other sub-systems of the mobile security monitoring system 10 in FIG. 1. The alarm security node 30 has a first input/output (I/O) means 301 for accessing e.g. alarm condition and alarm information from the intelligent security system 100 via a communication medium device 200. The first I/O means 301 can receive and convey diverse information from/to the intelligent security system 100 respectively. Further the alarm security node 30 has a second I/O means 302 for outputting said alarm information to said user device 500 coupled through a mobile network 400. This alarm information is forwarded in the SMS/MMS message form to the user 500. Further the alarm center 310 using said second I/O means 302 has provisions to get information regarding physical location of the user device 500 with respect to the security zone 101. Further an alarm feedback means is provided for getting feedback on said alarm information from said user device 500 to the alarm center 310 through said second I/O means and coupled via the mobile network 400. The alarm center 310 is further provided with an alarm evaluation means for processing said alarm condition and said alarm information from said intelligent security system 100 in light of said feedback from said user 500 utilizing said first I/O means and said second I/O means respectively.

Figure 4:
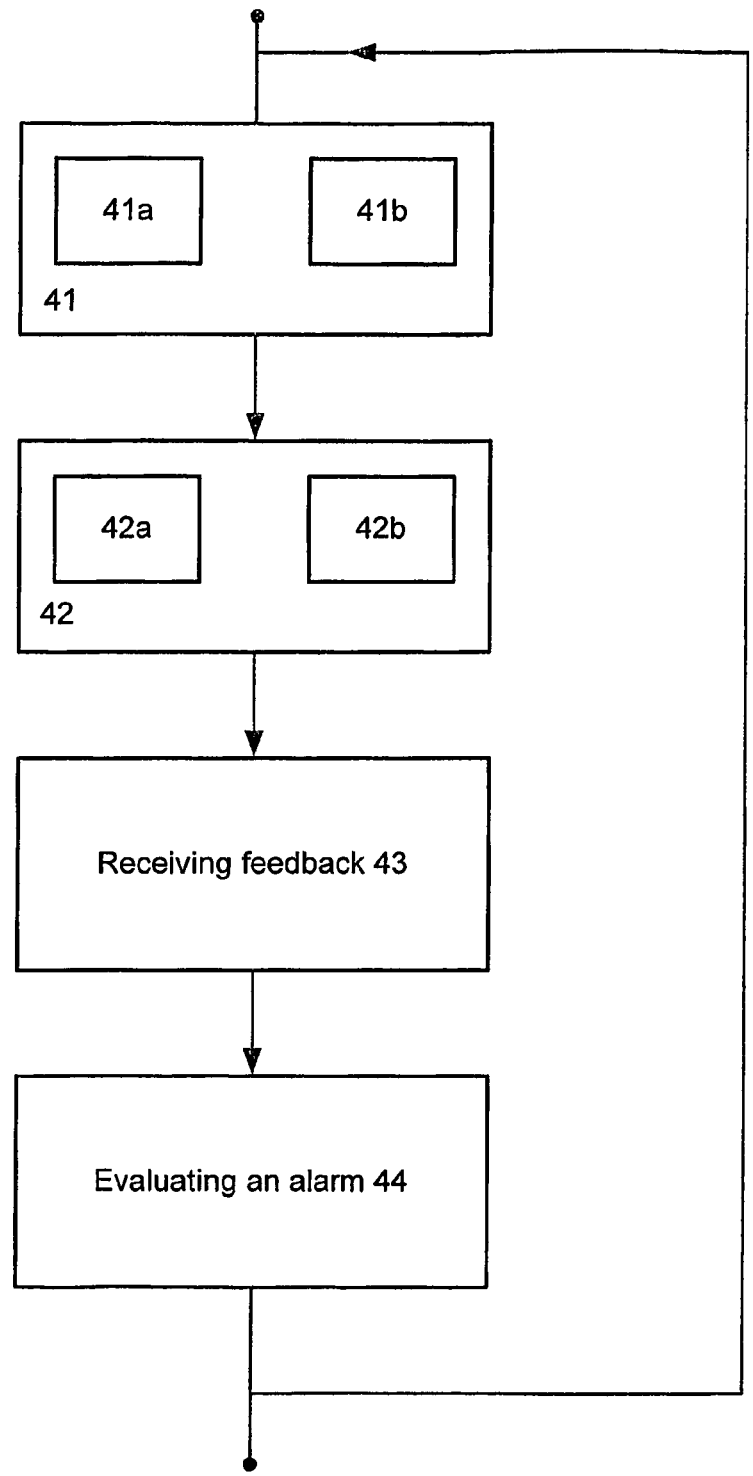
FIG. 4 is a process flow diagram of an alarm security node in mobile security system.

In FIG. 4, process flow 40 for the alarm security node 30 is provided. In step 41, provisions are provided for alarm security node 30 to a) get input i.e. the alarm condition and the alarm information from the intelligent security system 100 (step 41*a*); and convey feedback information and command sequences to said intelligent security system 100 (i.e. step 41*b*).

In step 42, the alarm center 310 forwards this alarm information to user device 500 via messaging center 412 (i.e. step 42*a*). Further the alarm center 310 acquires the physical location information of the user device 500 via the mobile positioning system 411 and/or using the GPS functionality via the GPRS Core network 402 (i.e. step 42*b*).

In step 43, the alarm center 310 has the feedback input from the user 500 on possible action on the alarm information. This feedback is provided via the mobile network 400. With the alarm information from the intelligent security system 100 and feedback from the user 500; the alarm center 310 has enough information to evaluate and initiate a subsequent action to resolve the alarm situation and/or condition (i.e. step 44).

In another embodiment when the user 500 is situated outside the security zone 101, there are provisions by the alarm security provider 300 as a part of the user 500 subscription to provide a personal emergency security. In the user device 500 J2ME application, exists an emergency button. During an emergency situation e.g. press of said emergency button on the user device 500, the J2ME application activates an emergency message with the GPS and/or the mobile positioning system 411 information, including a real time audio and video capture. The alarm center 310 uses said ParlayX call control for setup a call for false alarm conformation via Dual Tone Modulating Frequency (DTMF). Once authentication feedback is provided and severity of the situation confirmed by the alarm center 310, the security guard and/or a law enforcement agency can be directed to that physical location.

The invention claimed is:

1. A mobile security monitoring method comprising the steps of:
    monitoring an intelligent security system including a logic device, a plurality of detecting devices, and a video device;
    submitting information of a physical location of a user device to an alarm center by using a mobile positioning system;
    contacting said alarm center via a communication medium device for information on the present location of said user device with respect to a security zone protected by said intelligent security system;
    determining whether to activate at least one of the detecting devices in said intelligent security system to respond to an alarm condition based on said information of the physical location of the user device;
    sending an alarm information of said alarm condition via said communication medium device to said alarm center;
    informing said user device of said alarm information via a mobile network;
    prompting said user device to provide feedback on said alarm information to said alarm center via said mobile network; and
    operating on said alarm information by said alarm center by using the feedback from said user.

2. A mobile security monitoring method according to claim 1, wherein said monitoring of said intelligent security system includes the steps of:
    detecting said alarm condition in said intelligent security system;
    conveying said alarm condition to said alarm center via said communication medium device;
    receiving feedback from said alarm center via said communication medium device;
    recording using recording means of said alarm condition; and
    reacting to requests by the said alarm center via said communication medium device.

3. A mobile security monitoring method according to claim 1, wherein the physical location of said user is conveyed to said alarm center using a GPS functionality.

4. A mobile security monitoring method according to claim 1, wherein at least one of said monitoring means is activated by a change in said physical location of said user device in respect to said security zone protected by said intelligent security system, confirmed by said user device mobile positioning system.

5. A mobile security monitoring method according to claim 1, wherein at least one of said monitoring means is activated by a change in said physical location of said user device in respect to said security zone protected by said intelligent security system, confirmed by said user device said GPS functionality.

6. A mobile security monitoring method according to claim 1, wherein said alarm center is aware of said user device presence in said intelligent security system via said GPS functionality.

7. A mobile security monitoring method according to claim 1, wherein said alarm information comprises a text alarm information and/or a video alarm information.

8. A mobile security monitoring system comprising:
    an intelligent security system including:
        a monitoring device for monitoring a security zone;
        a plurality of detecting devices for detecting an alarm condition;
        a video device for recording said alarm condition; and
        a logic control device for reporting said alarm condition and an alarm information;
    an output for sending said alarm condition and said alarm information;
    a communication medium device including either a broadband, a ground-based telephony, a GPRS, a WLAN, or a high-speed wireless system or a combination thereof for transmitting said alarm condition and said alarm information to an alarm center including an application server,
    wherein said alarm center is arranged to receive said alarm condition and said alarm information via said communication medium device from said intelligent security system;
    wherein the alarm center is further connectable to a mobile network including a service network and a GPRS Core network;
    wherein said mobile network is arranged to receive said alarm information via the alarm center and to submit an output as a text or a video information to a user device, and said service network including a mobile positioning system and a messaging center such that the mobile positioning system can provide the physical location of the user device to the alarm center,
    wherein the intelligent security system is arranged to receive instructions from the alarm center of security measures,
    wherein the instructions are based on the physical location of the user device, and
    wherein the alarm center is arranged to take action based on feedback from the user device of the outputted text or video information.

9. A mobile security monitoring system according to claim 8, wherein said intelligent security system is arranged to be activated by a change in a physical location of the user device in respect to said security zone protected by said intelligent security system, confirmed by said mobile positioning system.

10. A mobile security monitoring system according to claim 8, wherein said intelligent security system is arranged to be activated by a change in a physical location of a user device in respect to said security zone protected by said intelligent security system, confirmed by a GPS functionality.

11. A mobile security monitoring system according to claim 8, wherein said messaging center comprises a SMS center and a MMS center.

* * * * *

UNITED STATES PATENT AND TRADEMARK OFFICE
CERTIFICATE OF CORRECTION

| | | |
|---|---|---|
| PATENT NO. | : 8,081,070 B2 | Page 1 of 1 |
| APPLICATION NO. | : 11/988835 | |
| DATED | : December 20, 2011 | |
| INVENTOR(S) | : Yeung et al. | |

It is certified that error appears in the above-identified patent and that said Letters Patent is hereby corrected as shown below:

In the Specifications:

In Column 9, Line 23, delete "authentication" and insert -- authentification --, therefor.

Signed and Sealed this
Second Day of October, 2012

David J. Kappos
*Director of the United States Patent and Trademark Office*